(12) United States Patent
Hetzel et al.

(10) Patent No.: US 8,909,172 B2
(45) Date of Patent: Dec. 9, 2014

(54) NETWORK WITH FLEXIBLE MULTIMEDIA DATA ROUTING

(75) Inventors: Herbert Hetzel, Schweigen-Rechtenbach (DE); Rainer Klos, Ettlingen-Oberweier (DE); Christian Thiel, Brannenburg (DE); Claudius Becker, Obstadt-Weiher (DE)

(73) Assignee: SMSC Europe GmbH, Karlsruhe (DE)

( * ) Notice: Subject to any disclaimer, the term of this patent is extended or adjusted under 35 U.S.C. 154(b) by 2170 days.

(21) Appl. No.: 11/106,030

(22) Filed: Apr. 14, 2005

(65) Prior Publication Data
US 2005/0238020 A1    Oct. 27, 2005

(30) Foreign Application Priority Data

Apr. 13, 2004    (DE) .......................... 10 2004 018 312

(51) Int. Cl.
*H04B 1/40*    (2006.01)
*H04L 29/06*    (2006.01)

(52) U.S. Cl.
CPC ...... *H04L 29/06027* (2013.01); *H04L 65/4076* (2013.01)
USPC ............. 455/88; 455/73; 455/550.1; 455/403

(58) Field of Classification Search
CPC ....................... H04L 29/06027; H04L 65/4076
USPC ......... 370/390, 351, 270, 312, 389, 328–337, 370/339, 341–348, 431–463, 310, 311; 455/403, 404.1, 404.2, 503, 455/550.1–90.3, 422.1, 450–455, 464, 509, 455/334, 343.1–343.5, 574; 709/231, 238
See application file for complete search history.

(56) References Cited

U.S. PATENT DOCUMENTS

| | | | | |
|---|---|---|---|---|
| 5,175,730 A * | 12/1992 | Murai | ............................ | 370/445 |
| 5,726,639 A * | 3/1998 | Romero et al. | .............. | 340/7.41 |
| 6,199,174 B1 | 3/2001 | Norizuki et al. | | |
| 6,678,258 B1 * | 1/2004 | Capurka et al. | ............... | 370/328 |
| 6,864,784 B1 * | 3/2005 | Loeb | ............................. | 340/441 |

(Continued)

FOREIGN PATENT DOCUMENTS

| JP | 2001-223718 | 8/2001 |
|---|---|---|
| JP | 2003-259240 | 9/2003 |

(Continued)

OTHER PUBLICATIONS

Kopetz et al., "The Time-Triggered Architecture," Proceedings of the IEEE Special Issue on Modeling and Design of Embedded Software, Oct. 2002, pp. 1-14.

(Continued)

*Primary Examiner* — Ronald Eisner
(74) *Attorney, Agent, or Firm* — Kevin L. Daffer; Daffer McDaniel LLP

(57) ABSTRACT

A digital network for communication between a plurality of subscribers by means of streaming data comprises at least one subscriber that is a transmitter, and at least one subscriber that is a receiver. At least one transmitter is adapted to be activated, and then to feed streaming data in the form of broadcasts or multicasts into the network. Furthermore, at least one receiver is adapted to be activated, and then to select from the network streaming data that are compatible with its data formats, and to read the selected streaming data from the network.

24 Claims, 2 Drawing Sheets

(56) References Cited

U.S. PATENT DOCUMENTS

| | | | |
|---|---|---|---|
| 6,873,605 B1* | 3/2005 | Bendak et al. | 370/282 |
| 6,981,055 B1* | 12/2005 | Ahuja et al. | 709/238 |
| 7,286,489 B2* | 10/2007 | Ades | 370/254 |
| 7,302,476 B1* | 11/2007 | Howarth et al. | 709/220 |
| 2001/0025376 A1 | 9/2001 | Knobl | |
| 2002/0015442 A1 | 2/2002 | Takeuchi et al. | |
| 2002/0101849 A1* | 8/2002 | Kang et al. | 370/349 |
| 2002/0141400 A1* | 10/2002 | DeMartino | 370/386 |
| 2003/0079035 A1 | 4/2003 | Boyd et al. | |
| 2003/0092386 A1* | 5/2003 | Miklos et al. | 455/41 |
| 2003/0229902 A1 | 12/2003 | Moni | |
| 2004/0114036 A1* | 6/2004 | Karaoguz et al. | 348/142 |
| 2004/0192189 A1* | 9/2004 | Yuhara et al. | 455/3.02 |
| 2004/0233844 A1* | 11/2004 | Yu et al. | 370/230 |
| 2005/0018615 A1 | 1/2005 | Itoh et al. | |
| 2005/0063313 A1* | 3/2005 | Nanavati et al. | 370/252 |
| 2005/0076136 A1* | 4/2005 | Cho et al. | 709/231 |
| 2006/0089838 A1* | 4/2006 | Gentric et al. | 705/1 |
| 2008/0205308 A1* | 8/2008 | Prehofer et al. | 370/310 |

FOREIGN PATENT DOCUMENTS

| | | |
|---|---|---|
| JP | 2003-318907 | 11/2003 |
| JP | 2003-338830 | 11/2003 |
| JP | 2004-538719 | 12/2004 |
| WO | 01/56297 | 8/2001 |
| WO | 03/015355 | 2/2003 |

OTHER PUBLICATIONS

Tappe et al., "MOST—Media Oriented Systems Transport," Electronik, vol. 14, Jul. 2000, pp. 3-7.

Oasis SiliconSystem, "VideoCompressor 4 MOST," Technical Information, Rev. 3.0, Jul. 2002, 20 pages.

Oasis SiliconSystem, "RadioTuner 4 MOST," V1.0.0, User Manual, Aug. 2003, 90 pages.

Oasis SiliconSystem, "DVDPlayer 4 MOST," V1.2.0, User Manual, Oct. 2003, 96 pages.

Oasis SiliconSystem, "Amplifer 4 MOST," Version 2.0, User Manual, Jul. 2003, 28 pages.

MOST Cooperation, "MOST Specification Framework," Rev. 1.1, 1999, 60 pages.

* cited by examiner

NETWORK WITH FLEXIBLE MULTIMEDIA DATA ROUTING

PRIORITY APPLICATION

This application claims priority to German Patent Application No. 102004018312.0 filed Apr. 13, 2004.

BACKGROUND OF THE INVENTION

1. Field of the Invention

The invention relates to a network and a network interface, and a method for operating a network for distributing streaming data, in particular multimedia data and related services.

2. Description of the Prior Art

For modern networks that are capable of multimedia applications and have a plurality of different subscribers, particularly in vehicles or buildings, users are increasingly demanding plug-and-play facilities. This means that different multimedia instruments should be capable of being connected to a bus system in a simple manner, i.e. without any further intervention on the part of the user being necessary. Furthermore, even future instruments having facilities that today are not yet known must be capable of being connected to the bus system In WO 01/56297 a distribution system for satellite television signals via a radio network (wireless LAN) is described. A set-top box connected to a satellite antenna has a respective demodulator for each connected television receiver. This demodulator converts the signals, received by the satellite, of a television channel selected by the television receiver to digital data, and transmits them to the television receiver. With this point-to-point communication, the television receiver can directly control the assigned demodulator of the set-top box, and then receive therefrom the corresponding television program. A defined bandwidth requirement of the network results from the given number of television receivers.

However, only as many television receivers may be connected to the set-top box as it has demodulators. Therefore narrow limitations are imposed upon an extension of the system. An extension with extraneous instruments, as for example a DVD player, is not possible. Similarly, no future multimedia instruments can be connected to the bus system.

BRIEF SUMMARY OF THE INVENTION

The invention is based on the object of designing a network capable of multimedia applications, so that different instruments capable of multimedia applications can be simply connected to the bus system. Preferably, connection shall be possible without any further intervention on the part of a user. Further objects of the invention are to design a subscriber for a digital network of the above kind, and to provide a method for operating a network of the above kind.

In accordance with the invention, the above object is achieved with a digital network for communication between a plurality of subscribers by means of streaming data, comprising: at least one subscriber that is a transmitter designed to emit data into the network; and at least one subscriber that is a receiver designed to receive data from the network; wherein at least one transmitter is adapted to feed streaming data in the form of broadcasts or multicasts into the network subsequent to being at least one of activated and connected to the network; and at least one receiver is adapted to select a data stream compatible with the subscriber, and to read the streaming data of the data stream from the network, subsequent to being at least one of activated and connected to the network.

In accordance with the invention, an above further object is achieved with a subscriber for a digital network for communication between a plurality of subscribers by means of streaming data, comprising: at least one subscriber that is a transmitter designed to emit data into the network; and at least one subscriber that is a receiver designed to receive data from the network; wherein the subscriber is a transmitter adapted to feed streaming data in the form of broadcasts or multicasts into the network subsequent to being at least one of activated and connected to the network.

Finally, in accordance with the invention, an above further object is achieved with a method for operating a network for communication between a plurality of subscribers by means of streaming data by the steps of: emitting data into the network by at least one subscriber that is a transmitter; and receiving data from the network by at least one subscriber that is a receiver; the method comprising the further steps of: connecting at least one network subscriber that is a transmitter to the network; activating the at least one network subscriber that is a transmitter; emitting streaming data with the at least one network subscriber that is a transmitter; connecting at least one network subscriber that is a receiver to the network; activating the at least one network subscriber that is a receiver; and receiving streaming data from the network with the network subscriber that is a receiver.

BRIEF DESCRIPTION OF THE DRAWINGS

In the following the invention will be described by way of example, without limitation of the general inventive concept, on examples of embodiment with reference to the drawings.

DESCRIPTION OF PREFERRED EMBODIMENTS

Figure 1:
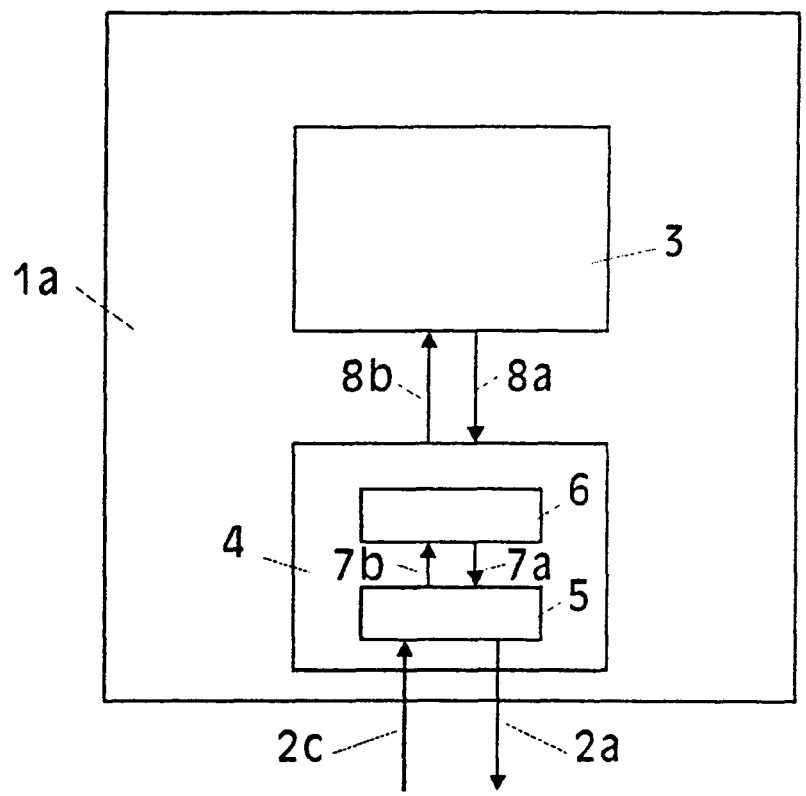
FIG. 1 schematically shows in a general form a device in accordance with the invention.

FIG. 1 shows in a schematic form a device in accordance with the invention. A network subscriber $1a$ (also designated as a network node) has links $2a$, $2b$ for communication with other network subscribers. The communication may be effected, for example, via optical and also electrical links, or also for example, by means of radio links. Similarly, a bidirectional link is also conceivable instead of the two sketched unidirectional links.

Furthermore, the network subscriber comprises a network interface 4 and also an application 3. Here the application is representative of a plurality of different facilities of the network subscriber. Thus these may be, for example, a radio receiver, a CD or DVD player, or also a software for coding or recoding of data.

The network interface 4 has a physical layer 5 containing the communication hardware for physical links to other network subscribers. Furthermore, the network interface 4 has transmitters or receivers 6 for emitting or receiving data, respectively. A communication between the transmitter or receiver with the elements of the physical layer 5 is effected via internal communication paths $7a$, $7b$. A communication of the application 3 with the network interface 4 is possible via external communication paths $8a$, $8b$.

Figure 2:
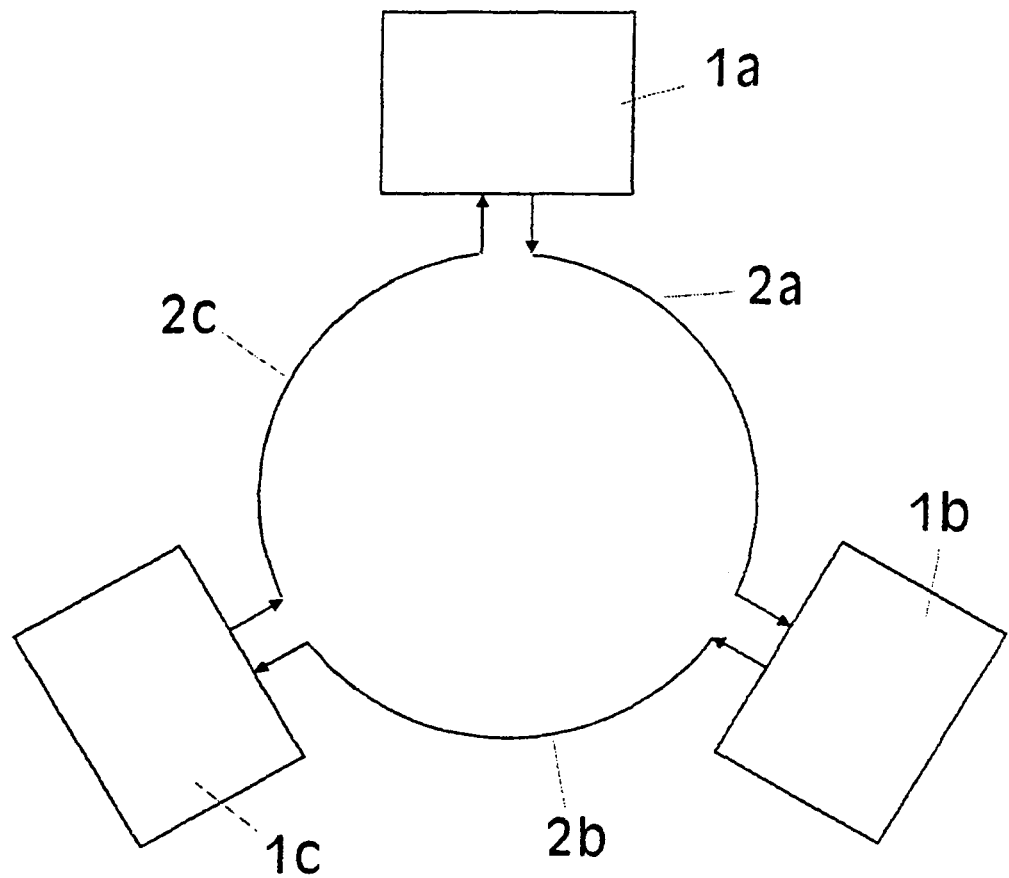
FIG. 2 illustrates the invention on an example of a ring bus.

In FIG. 2 is illustrated an interconnection of a plurality of nodes in the form of a ring bus. The individual nodes $1a$, $1b$, $1c$ communicate via the links $2a$, $2b$, $2c$ that are interconnected in the form of a ring. Thus, the first node $1a$ can transmit information by means of the first link $2a$ to the second node $1b$. This can transmit information via the second link 2b to the third node 1c. The circle is closed by the third link 2c between the third node and the first node.

A digital network in accordance with the invention serves for communication between a plurality of subscribers (network node) by means of streaming data. Streaming data are here understood to be data that are transmitted via the network as a data stream capable of real-time operation. These streaming data preferably serve for a transmission of multimedia data, such as, for example, audio or video signals. The network comprises a plurality of subscribers, at least one subscriber being adapted to emit data (transmitter), and at least one other subscriber being adapted to receive data. At least one subscriber, as a transmitter, is adapted to emit streaming data automatically to the network as soon as it is connected thereto or activated. The emission of these streaming data is effected preferably as a broadcast or multicast. Furthermore, at least one subscriber is adapted to be a receiver that reads streaming data from the network after being connected to the network, or activated. For this, it selects from the streaming data available on the network the data which are compatible with the receiver, and therefore can be further processed by the receiver.

This means that a subscriber as a transmitter, or a transmitter, subsequent to being connected to the network, begins with a non-directed transmission of streaming data into the network. Thus, any desired transmitters may be connected to the network in simplest manner. Subsequent to their being connected to the network, they independently begin to emit data. Thus, for example, a CD player will begin to emit recorded music into the network. Similarly, a DVD player could begin to play back a recorded video and feed this into the network. A radio receiver could begin with a feeding-in of a preset program directly after being connected.

Accordingly, a subscriber as a receiver, or a receiver, could begin with to receive streaming data from the network as soon as being connected to the network, or activated. For this, data streams that are compatible with the receiver are selected from the data traffic of the network, and evaluated. With this embodiment, networks may be assembled in a simple manner, and also individual subscribers may be added or removed during the operation of the network, without the network being shut down or newly configured. Furthermore, no central administration of the network is necessary.

An activation of a network subscriber may be effected, automatically, for example by the process of connecting, by the application of a supply voltage, or by an activation signal. An activation signal of this kind could be emitted, for example in the case of a CD player, when the instrument is ready for play-back. Similarly, an activation signal could also be emitted directly by a user or an application. Similarly, activation signals from other subscribers of the bus system, in particular from a central control unit, are possible. Here the application can be effected optionally by directed or undirected communication.

The simplicity of a network in accordance with the invention will be demonstrated by an example: if, for example, a CD player is connected to the network as a first subscriber, then it will commence with an emission of audio data from the CD to the network. As no receiver is yet present on the network, the data are not used any further. However, no fault is indicated to the CD player, as would be the case with conventional networks with directed communication when the receiving subscriber were not to answer. If at a later time an audio amplifier were to be connected to the network, then this would seek a data stream usable by it. It will then recognize and receive the data stream of the CD player. If now a video display is also connected to the network, then this will also seek a compatible data stream, namely a video data stream. This, however, it cannot find, because no video source has as yet been connected to the network. If now, for example, a DVD player is connected to the network, then this will begin with the emission of a video data stream. This can now be recognized by the video display as being compatible, and received for display.

A network in accordance with the invention is preferably built up on an optical bus system, and again preferably on a ring bus. Especially preferred is a synchronous bus system, because streaming data can be disseminated as multicast or broadcast almost exclusively with such a synchronous bus system.

In another advantageous embodiment of the invention at least one subscriber is adapted to be a transmitter and a receiver at the same time. A subscriber of this kind, for example, could be a car radio having a radio receiver and an audio amplifier. In this case, the audio amplifier could be logically completely decoupled from the radio receiver, because it simply receives from the bus and plays back any audio data that could also originate from the radio receiver. Here the audio amplifier need not distinguish between data from the radio receiver and another source, for example a CD player. With this, a substantially more extensive modularization of the individual instruments may be achieved.

Another advantageous embodiment of the invention provides for at least one subscriber optionally to have a plurality of receivers and/or a plurality of transmitters. A transmitter or receiver of this kind need not be identical with the physical network node (subscriber). Thus, a receiver may be, for example, another coder-decoder for particular audio or video formats. A video display having an integrated audio amplifier, for example, could be designed to be a physical network node (subscriber), and would at the same time have various coder-decoders for video formats, such as AVI, DIVx or MPEG for example, and also for audio formats such as MP3. With this, a wider choice from the various data streams of the network becomes possible. If, for example, no video source has as yet been connected to the network, then an audio source also could be played back. Of course, a desired audio or video source could be chosen by the user from a plurality of audio and video sources.

Furthermore, a network subscriber could be employed also as a converter for codings. Thus it could have, for example, a receiver for uncompressed video data. Furthermore, a transmitter could be provided for emitting to the network in a compressed form the uncompressed video data received by the receiver. Similarly, for example, the audio signals could be separated from a received video signal and put onto the network as an independent signal. With converters of this kind, the compatibility of different instruments with respect to the coding can be achieved in a simple way and manner.

In a further advantageous embodiment of the invention, at least one subscriber is designed to be a transmitter or receiver for obtaining additional information from one or a plurality of transmitters or receivers by interrogation. Similarly, at least one transmitter is designed so that when being interrogated by a receiver, it transmits information to the latter concerning available or actually transmitted data streams. As an alternative to this, the transmitter could also continuously, or at given time intervals, emit together with the data stream essential information on the emitted data stream, which can then be evaluated by receivers. In the same way, information on the operating condition of a transmitter may be issued. With this, a receiver is in a position to interrogate one or a plurality of transmitters on the actually transmitted or possible data streams. Here the interrogation may be effected optionally as a non-directed link (broadcast, multicast), or also as a directed link when the transmitter is known or, for example, can be identified on the basis of a received data stream. The information exchanged between transmitter and receiver preferably relates to the transmitted data formats, or also to the contents, for example, titles, interpreters, duration of performance etc. The answers emitted by the transmitter to queries by a receiver may be sent as discrete data packages, or also incorporated in the data stream. Similarly, transmitters could be configured so that at certain time intervals they disseminate information, preferably by broadcasts, on the streaming data issued by them. In a similar manner, receivers could also signal operating conditions to transmitters or other network subscribers. The interrogations are effected preferably by mechanisms that are standardized at least within the network, such as fixed network addresses.

In another advantageous embodiment of the invention, at least one receiver is designed to have a facility for evaluating the contents of certain data streams, and to select the data streams compatible with it on the basis of the evaluation. With such a facility, a receiver of this kind is in a position to evaluate data streams, or preferably their header, and to check their compatibility with its own possible data formats. When a receiver identifies a compatible data stream, then it can play back the same.

Another advantageous embodiment of the invention provides for a receiver to be designed so that in a case of a plurality of compatible data streams it performs at least a selection of a received data stream or streams on the basis of given criteria, such as priorities, for example. Thus, for example, a video display has a higher priority for a playback of video streaming data versus a playback of audio streaming data. Accordingly, for example, a video display with an incorporated audio amplifier will first attempt to play back a video data stream. If, however, it cannot identify any such data stream on the network, then it will play back an available audio data stream. If at a later time a compatible video data stream is put onto the network, then the video display could switch over to this. Furthermore, even different data formats of the same category could be assigned different priorities. Thus, the video display could, for example, switch over from a playback of a video data stream with low resolution to a video data stream with high resolution having a higher priority. Basically, a control of the playback may also be effected according to other criteria.

Another embodiment of the invention provides for the selection of the streaming data to be performed by the user. Advantageously, the receiver offers the user a listing of the receivable streaming data and leaves to him the selection of a suitable channel, for example in the form of a menu. Similarly and also advantageously, a selection of the streaming data of a transmitter put onto the network may be effected by a user.

In another embodiment of the invention, a subscriber, for example a control unit, is provided for optionally controlling the emission of streaming data from individual transmitters, and/or the receipt of streaming data from individual receivers. A control unit of this kind may be configured as an independent unit or as an independent subscriber, or also may be assigned to a transmitter and/or a receiver.

This control unit could, for example, request a CD player present in a network to play back a selected piece of music as streaming data into the network. Furthermore, for this, a suitable audio amplifier could be controlled to select the corresponding streaming data. Preferably, the control unit is adapted so that, for example, in the case of a new link or also of an activation of transmitters or receivers, it interrogates these concerning various parameters such as, for example, data formats, available titles etc. An interrogation of this kind could be also performed at certain intervals by broadcasts. A control of this kind also includes a control of the transmitter bandwidth or the data volume into the network, and also a disconnecting or connecting of individual transmitters and receivers from or to the network, respectively. In order to perform this control function, a control unit is advantageously adapted to identify active or passive bus subscribers (transmitters or receivers). Furthermore, it advantageously has at least one facility for signalizing those transmitters which are active or passive. In order to simplify the control, the control unit is preferably adapted to establish given transmitter/receiver combinations. These may be set or requested, for example from outside, or also by an operator. Similarly also, a given logic operation may be established by a user, or any desired transmitter/receiver combinations may be established with an external signal. In an especially advantageous embodiment, the control unit can recognize and resolve conflicts of bandwidth. A resolution may be performed, for example, by enlarging the synchronous bandwidth of a network, or also by reducing the bandwidth of one or a plurality of transmitters, or by deactivating one or a plurality of transmitters. A resolution of this kind may be effected under the control of a user, or according to memorized decision criteria.

Another embodiment of the invention provides for at least one transmitter to have a facility for controlling its transmission bandwidth or the data volume, in particular for an increase or a reduction thereof. This facility is preferably controlled by receivers that, for example when receiving, transmit information on the reception at certain time intervals to the transmitter concerned. This is comparable with a watchdog facility. If, for example, no more information on the reception is transmitted within a given time interval (timeout), then the transmitter may presume that it is no longer needed, and reduce the bandwidth accordingly, or even switch itself off. Similarly, when its data can be further processed only in a restricted form, it could transmit them with a reduced bandwidth. Furthermore, it could be reactivated, for example by a broadcast from receivers seeking new data sources. Similarly it could, upon request by a receiver, increase its bandwidth and therewith also the transmission quality. As an alternative to a control of this facility by receivers, the transmitter may also independently ascertain whether or how the data sent out by it are received or used by receivers. This may be effected, for example, on the basis of information from routing tables, or also by selective communication, as for example PING. Furthermore, control of the bandwidth may be effected, of course, by a user or an application. Thus, for example, a user also could himself select the desired bandwidth at the instrument itself, or even deactivate the instrument. For this, a deactivated instrument (subscriber) optionally could be completely switched off or operated in a standby mode. Thus, a subscriber of this kind would not be able to emit any more streaming data, but could still respond to an interrogation concerning additional information or other network traffic. As an alternative to this, a deactivated subscriber could emit an empty data stream (null pattern), or a data stream without usable content, but with, for example, a given or random pattern (idle pattern).

In another advantageous embodiment of the invention, at least one transmitter is adapted to reduce independently its transmission bandwidth, and therewith the data traffic emitted by it to the network, when a limit value of the network load has been exceeded. Similarly, the reduction also could be effected in proportion to, or in accordance with, another function in dependence upon the network load. With this, an overloading of the network can be prevented.

Further subject matter of the invention is the design of a subscriber as a transmitter for a digital network. Subsequent to its activation and/or its connection to the network, a transmitter of this kind feeds-in streaming data in the form of broadcasts or multicasts.

Additional subject matter of the invention is the design of a subscriber as a receiver for a digital network, which subsequent to its activation and/or its connection to the network reads streaming data from the network.

Furthermore, subject matter of the invention is a method of operating a network, comprising the connection of a network subscriber designed as a transmitter, and its activation, and also the emission of streaming data into the network by the network subscriber. Furthermore, at least one network subscriber designed as a receiver is connected to the network and activated, and streaming data are received from the network by this network subscriber. In this, the temporal sequence of connection or activation of a transmitter or receiver is of no consequence. Thus, for example, the transmitter may be connected and activated first, and the receiver connected and activated later. Similarly, the sequence of connection and activation of the transmitter and receiver may be interchanged. Also, for example, a receiver may be connected first, and then a transmitter, then the receiver may be activated, and finally the transmitter may be activated. Of course, a reception of valid data is possible only after their emission by the transmitter.

The invention claimed is:

1. A digital network for communication between a plurality of subscribers by means of streaming data, comprising:
    at least one subscriber comprising a transmitter designed to transmit data on the network, wherein the transmitter is adapted to automatically feed non-directed streaming data into the network at the moment in which the transmitter receives power via a supply voltage;
    at least one subscriber comprising a receiver designed to receive data from the network, wherein the receiver is adapted to select a non-directed data stream compatible with the receiver, and to automatically read the streaming data of the non-directed data stream from the network at the moment in which the receiver receives power via a supply voltage; and
    at least one transmitter having at least one facility for deactivation of said transmitter, or at least for reducing a transmission bandwidth of said transmitter, in the case of said streaming data not being received, or further processed, or at least further processed to a limited extent by any receiver, within a certain time interval.

2. The digital network according to claim 1, further comprising at least one subscriber including at least one of a plurality of transmitters and a plurality of receivers.

3. The digital network according to claim 1, further comprising at least one subscriber adapted to receive streaming data and to transmit received data in a recoded form.

4. The digital network according to claim 1, further comprising at least one subscriber comprising a transmitter for transmitting additional information on at least one of a functionality of the subscriber, a status of the subscriber, and content of said streaming data.

5. The digital network according to claim 4, wherein the at least one subscriber is adapted to transmit the additional information either in the form of discrete data packages or incorporated in the streaming data, wherein the streaming data is transmitted as unicast, multicast or broadcast data.

6. The digital network according to claim 1, further comprising at least one subscriber comprising a receiver for emitting additional information on at least one of a functionality of the subscriber and a status of the subscriber.

7. The digital network according to claim 1, further comprising at least one subscriber adapted to receive and evaluate additional information from other subscribers.

8. The digital network according to claim 7, wherein the at least one subscriber comprises a facility for specifically requesting the additional information from the other subscribers.

9. The digital network according to claim 7, wherein the at least one subscriber is adapted to select data streams compatible with the receiver on the basis of the additional information or from a table disseminated in the network.

10. The digital network according to claim 1, further comprising at least one subscriber comprising a receiver, wherein said at least one subscriber comprises a facility for evaluating contents of particular data streams, and for selecting data streams that are compatible with the receiver according to given criteria.

11. The digital network according to claim 1, further comprising at least one subscriber comprising a receiver, wherein said at least one subscriber is adapted to perform a selection of data streams that are compatible with the receiver according to given criteria.

12. The digital network according to claim 1, further comprising at least one subscriber comprising a receiver, wherein said at least one subscriber is adapted so that a selection of data streams to be received by the receiver from activated or deactivated transmitters is effected by a user.

13. The digital network according to claim 12, wherein the at least one subscriber offers to the user a selection of the data streams to be received in the form of a menu comprising a listing of compatible data streams.

14. The digital network according to claim 1, further comprising at least one transmitter having at least one facility for adapting a transmission bandwidth of said transmitter to a capacity of the network.

15. The digital network according to claim 14, wherein the at least one transmitter has at least one facility for adapting the transmission bandwidth by at least one of increasing the transmission bandwidth, and reducing the transmission bandwidth.

16. The digital network according to claim 14, wherein the at least one transmitter has the facility of deactivating the transmission.

17. The digital network according to claim 1, further comprising at least one transmitter having at least one facility for analyzing a use of the data emitted by said transmitter.

18. The digital network according to claim 17, wherein the use of the data is that of interrogating other network subscribers.

19. The digital network according to claim 17, wherein the use of the data is that of interrogating receivers.

20. The digital network according to claim 17, wherein the use of the data is that of evaluating routing tables.

21. The digital network according to claim 1, further comprising at least one subscriber for controlling other subscribers designed as transmitters or receivers, either singly or in groups, and for activating or deactivating the other subscribers, as necessary.

22. The digital network according to claim 1, further comprising at least one subscriber for controlling at least one transmitter or at least one receiver to transmit particular data as streaming data into the network, or to receive particular streaming data from the network.

23. The digital network according to claim 22, wherein the at least one subscriber controls the at least one transmitter and the at least one receiver to establish an assignment of transmitters and receivers to each other.

24. A digital network for communication between a plurality of subscribers by means of streaming data, comprising:
   at least one subscriber comprising a transmitter designed to transmit data on the network, wherein the at least one subscriber comprising the transmitter has at least one facility for deactivation of said transmitter, or at least for reducing a transmission bandwidth of said transmitter, in the case of said data not being received, or further processed, or at least further processed to a limited extent by any receiver, within a certain time interval; and
   at least one subscriber comprising a receiver designed to receive data from the network, wherein the receiver is adapted to automatically read non-directed streaming data from the network upon connecting the receiver to a supply voltage and determining that the non-directed streaming data is compatible with the receiver.

* * * * *